(12) United States Patent
Vaupel et al.

(10) Patent No.: US 9,097,518 B2
(45) Date of Patent: Aug. 4, 2015

(54) METHOD FOR DETERMINING ROUGHNESS DATA AND/OR TOPOGRAPHY DATA OF SURFACES IN MATERIAL MICROSCOPY

(71) Applicant: Carl Zeiss Microscopy GmbH, Jena (DE)

(72) Inventors: Matthias Vaupel, Goettingen (DE); Helmut Lippert, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 14/208,690

(22) Filed: Mar. 13, 2014

(65) Prior Publication Data

US 2014/0285814 A1    Sep. 25, 2014

(30) Foreign Application Priority Data

Mar. 20, 2013   (DE) .......................... 10 2013 005 187

(51) Int. Cl.
| | |
|---|---|
| *G01B 9/02* | (2006.01) |
| *G01B 11/30* | (2006.01) |
| *G02B 21/00* | (2006.01) |
| *G02B 21/18* | (2006.01) |

(52) U.S. Cl.
CPC .......... *G01B 11/303* (2013.01); *G02B 21/0016* (2013.01); *G02B 21/0092* (2013.01); *G02B 21/18* (2013.01)

(58) Field of Classification Search
CPC .... G01B 9/02; G01B 11/303; G01B 11/0608; G01B 11/2441; G01J 9/02
USPC ........................................................ 356/495
See application file for complete search history.

(56) References Cited

U.S. PATENT DOCUMENTS

| | | | |
|---|---|---|---|
| 4,534,649 A | 8/1985 | Downs | |
| 5,914,782 A | 6/1999 | Sugiyama | |
| 2006/0103923 A1 | 5/2006 | Dietrich et al. | |
| 2006/0158657 A1* | 7/2006 | De Lega et al. | ............... 356/497 |

FOREIGN PATENT DOCUMENTS

DE   10 2004 048 300 A1   4/2006

OTHER PUBLICATIONS

Jabr, "Surface-roughness measurement by digital processing of Nomarski phase-contrast images", Optics Letters, Nov. 1985, vol. 10, No. 11, pp. 526-528.
Schey et al., "Gepulste laserdeposition und TIC-Mikro-skopie-zwei Methoden für die effective und intelligente Schichtentwicklung", Photonik, 2004, pp. 42-45.
German Search Report for German Application No. 10 2013 005 187.8, Oct. 14, 2013, 6 pages.

* cited by examiner

*Primary Examiner* — Tarifur Chowdhury
*Assistant Examiner* — MD Rahman
(74) *Attorney, Agent, or Firm* — Patterson Thuente Pedersen, P.A.

(57) ABSTRACT

A method for determining roughness data and/or topography data of surfaces in material microscopy, particularly from flat samples, based on a shearing polarization interferometrical sequence with a microscopic "TIC" module ("Total Interference Contrast Module") of a microscope, wherein the method can be carried out both polychromatically and monochromatically. At least two tilted wave fronts are generated, which after reflection or transmission on a sample generate two images of said sample in the form of fringe patterns, said images being offset relative to one another and interfering with one another, from which roughness values and height topographies of the surface of the sample are determined by application of image evaluation.

14 Claims, 4 Drawing Sheets

FIGURE 2A
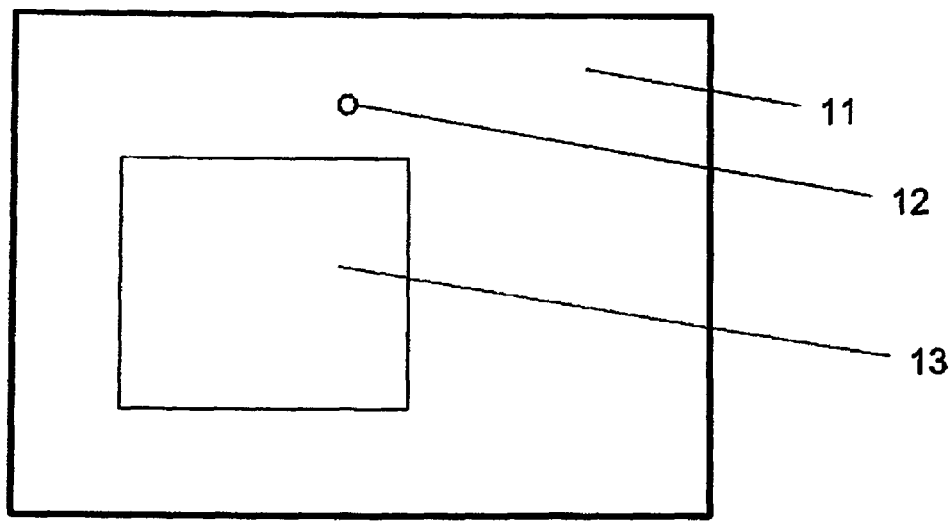
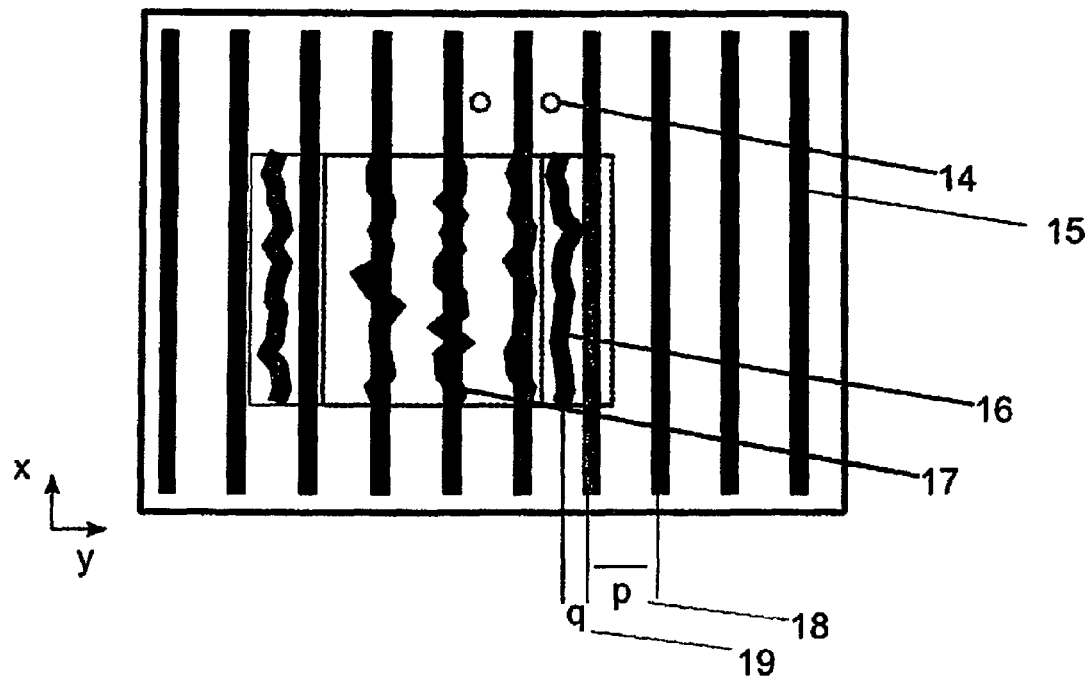
FIGURE 2B

METHOD FOR DETERMINING ROUGHNESS DATA AND/OR TOPOGRAPHY DATA OF SURFACES IN MATERIAL MICROSCOPY

RELATED APPLICATION

The present application claims priority to German Application No. 10 2013 005 187.8, filed Mar. 20, 2013, which is incorporated herein in its entirety by reference.

FIELD OF THE INVENTION

The invention relates to a method for determining roughness data and/or topography data of surfaces in material microscopy, particularly of flat samples, based on a shearing polarization interferometrical sequence with a microscopic "TIC" module ("Total Interference Contrast Module") of a microscope, wherein the method can be carried out both polychromatically and monochromatically.

BACKGROUND OF THE INVENTION

A method for contact-free and extensive layer thickness measurement, which simultaneously provides data about the morphology and the thickness of the layer, is TIC microscopy. The acronym TIC stands for "Total Interference Contrast". This technology is a shearing polarization interferometrical process, which generally works with circular polarized or polychromatic light, and which is described in more detail in "Schey et al., Photonik 3, 42 (2004)", for example. A TIC module such as this has been offered by Carl Zeiss for some time. In order to determine these topographies or surface roughnesses of relative flat samples, "Phase Shifting Interferometry" would be an option for the standard method, which, however, exhibits a certain sensitivity to environmental vibrations. This is a measuring method, which is used in optics (interferometry, fringe projection) and in electronics to determine the phase position of a modulated signal by way of point-wise intensity measurements.

There are similar problems with confocal measuring methods, which are based on the sequential generation of several images. These problems are generally circumvented by using methods that are based on an interferometrical one-shot measurement, digital holographic microscopy, for example. However, the equipment expenditure is very high here.

In U.S. Pat. No. 4,534,649, a polarization interferometer for profile detection is described, in which a lateral offset, that is, a "shearing" is also mentioned. No further details are provided.

Furthermore, in Jabr, Optics Letters 10, 526 (1985), a microscope is described, which is related to "TIC", and in this context is used especially for determining surface roughnesses, wherein the roughness data are derived from intensity variations, which entails a certain susceptibility to error, with respect to detector noise, for example.

SUMMARY OF THE INVENTION

Based on the disadvantages of the solutions of the prior art, an example embodiment of the invention further develops a method for determining roughness and topography data of surfaces in material microscopy such that apart from the roughness evaluation, the capture of one- and two-dimensional topography data is also possible, without a complex interferometer construction and with relatively little expenditure.

According to an example embodiment of the invention, two tilted wave fronts are generated by way of a position change of a TIC prism, which after reflection or transmission on a sample generate two images of said sample in the form of fringe patterns, said images being offset relative to one another and interfering with one another, from which roughness values and/or height topographies of the surface of the sample are determined by way of image evaluation.

The method can be beneficially executed both with circular-polarized and with linear-polarized light.

The movement of the TIC prism allows a tunable phase shift and/or a prism rotation as well as the orientation of the interference fringes relative to the sample. In this way, compared to the state of the art solutions, a better flexibility in the combination with a standard microscope and with respect to the sample geometry is provided.

In addition, the low complexity as well as the option of a one-shot measurement, coupled with a low susceptibility to interference (low susceptibility to vibrations), are substantial benefits. Standard light sources, including polychromatic ones, can be used here.

Beneficially, a calibration of height data is done by application of an optical model for converting a measured phase into a height or into other optical parameters of the sample. The calibration is robust against vibration.

For the purpose of focus evaluation of individual line profiles with direct determination of height topographies, a reference is defined beforehand, whereas in a statistical evaluation of individual height lines, comparisons and summations to other height lines are made.

Expediently, an integral evaluation perpendicular to the fringe patterns is carried out for the purpose of direct acquisition of topography data.

For an extensive evaluation of the topography data, it is of benefit to do a Fourier analysis.

For capturing two-dimensional topography data, a scanning of the fringe patterns along a defined direction through a defined phase shift between the wave fronts by way of the known per se mechanism of shifting the TIC prism and/or shifting the sample itself is done.

BRIEF DESCRIPTION OF THE DRAWINGS

The method according to the invention is described in more detail below with the aid of an exemplary embodiment, wherein:

FIG. 2A is an illustration of a reflected light image of a sample having a flat surface;

FIG. 2B is an illustration of a monochromatic TIC image;

DETAILED DESCRIPTION OF THE DRAWINGS

Figure 1:
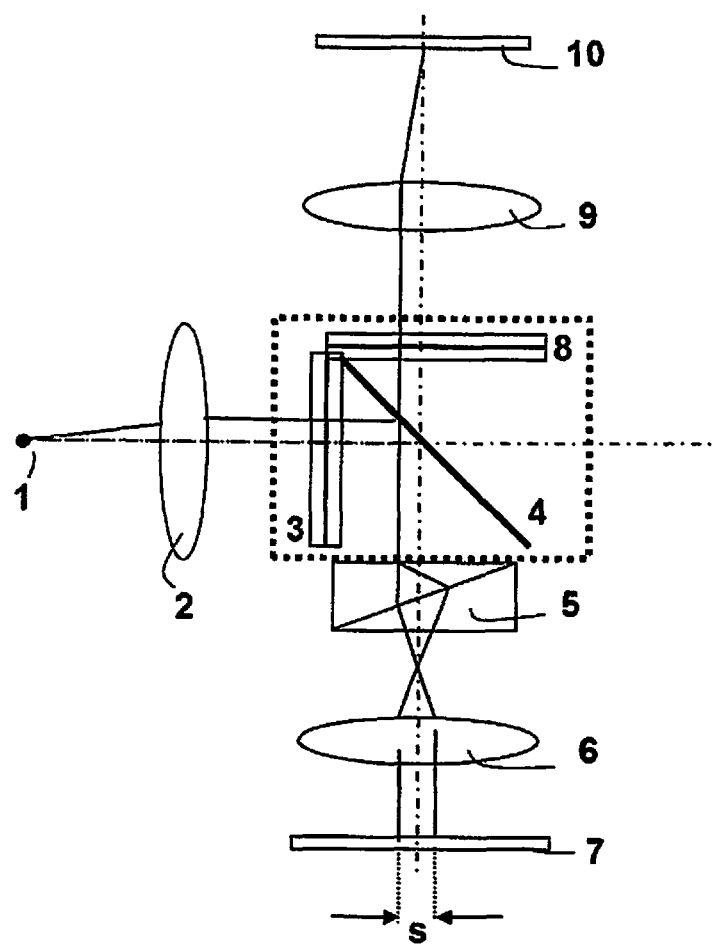
FIG. 1 is a typical illustration of the beam path of a microscope equipped with a TIC module.

FIG. 1 shows a typical construction of an example embodiment, as it is normally used. Characteristic is the TIC prism 5, which is generally configured as a birefringent polarization optical element and generates two tilted wave fronts, which after reflecting on a sample (not shown) ultimately generate in the plane 10 two images of the sample, said images being offset relative to one another by the value s and interfering with one another. The interference appears in the form of a fringe pattern due to the tilting.

To this end, the light coming from a light source 1 passes through an illumination lens 2 and is circularly polarized by a circular polarizer 3. A plane glass 4 partially reflects the circularly polarized light to the TIC prism 5. This causes a splitting s relative to the object plane 7, which is a multiple of the resolution limit (generating a clearly visible dual image). In this way, a double pupil image is formed, and an interference fringe system as a result thereof. After reflection on a sample (not shown), the two partial bundles tilted towards each other pass again through the objective lens 6, are reunited by the TIC prism 5 and pass through a circular analyzer 8. A visible interference fringe system formed in this way is illustrated via a tube lens 9 in the plane 10.

The active principle of the method according to the invention is explained with reference to FIGS. 2A and 2B, 3, 4A and 4B.

To begin with, FIG. 2A outlines exemplarily the microscopic reflected light image of the sample having a flat surface 11, and a rough surface 13 in the form of a coating field applied thereto. For a better understanding, a "dirt artifact" in the form of a dust particle, for example, is indicated with reference numeral 12. In FIG. 2B, a monochromatic TIC image is illustrated. Initially, the dual image character can be seen, with the aid of a duplicate artifact 14, for example. The figure is further characterized by interference patterns 15, 16, 17.

If the interference is based on light fractions solely derived from the flat, non-rough surface, the fringes are of a very regular shape, as in 15. The fringe spacing p is determined both by the length of the wave and the tilt angle. In the region of the rough coating there are fringes, which are generated either from light fractions of the rough and of the flat surface, or from light fractions 16, that is, 17 exclusively from the rough surface (FIG. 2B). In both cases, the fringes deviate from the ideal line shape, which is due to the roughness. On the basis of the fringe 16, assuming 11 to be the ideally flat reference surface, the 1D surface profile of the sample can be deduced instantly. For this purpose, along the direction x, the central co-ordinate along y (shearing direction) can be determined for each fringe element, for example. After conversion, the deviations from an ideal straight line along the direction x (perpendicular to the shearing direction) then instantly return the height value z. As a matter of course, the shearing direction as well as the conversion factor must be determined beforehand, on the basis of the ideal fringe pattern, for example (by determining the orientation of the fringe and the spacing p).

Figure 3:
FIG. 3 is an illustration of the height profile.

The height profile derived from 16 is illustrated in FIG. 3 as an example.

For fringe 17, an adequate proceeding is not readily possible, because the deviations from the ideal straight line from height variations come about in two points. This, however, is not relevant for determining the roughness of the surface since after conversion using a factor ½^0.5, it is directly coupled to the variance of the deviations along the direction x.

FIG. 2B illustrates the monochromatic case to begin with. In general, a polychromatic light source can also be used, however.

Figure 4A:
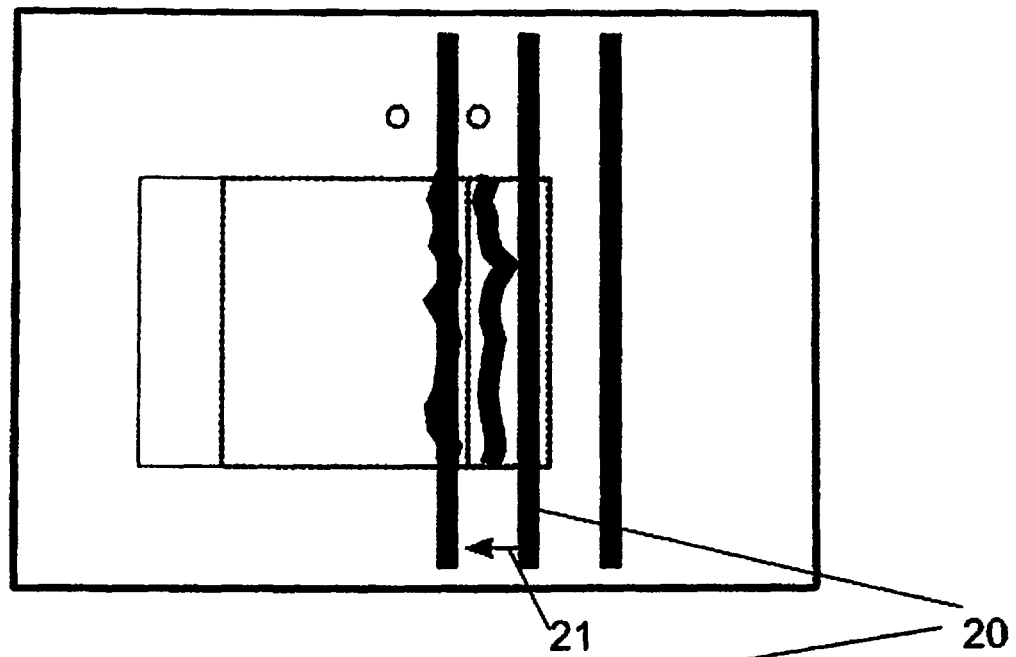
FIG. 4A is an illustration of an interference pattern.
Figure 4B:
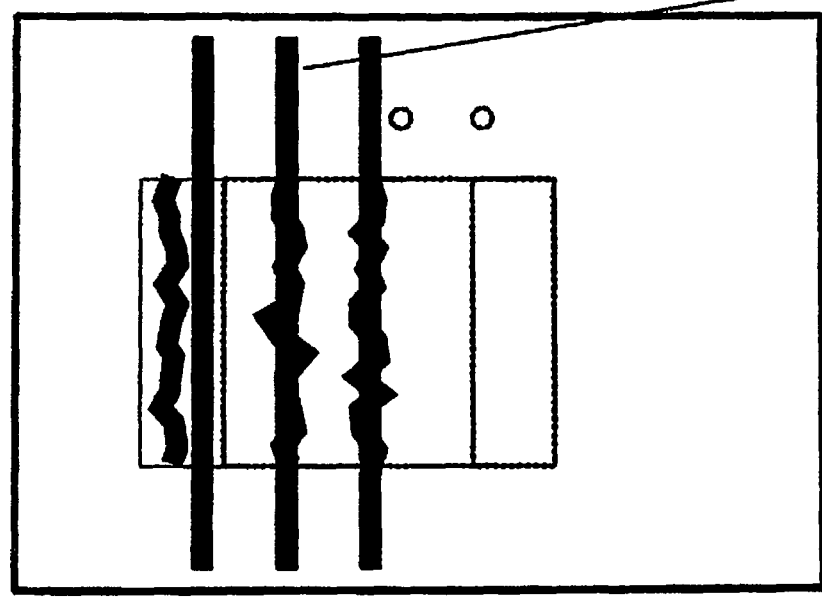
FIG. 4B is an additional illustration of an interference pattern.

As shown in FIGS. 4A and 4B, the interference pattern 20 is not homogenously formed across the image field here, which ultimately has to do with the reduced coherence length in this case r. Beyond the interference center, the fringes are no longer sufficiently distinct and "smear" to a color fringe. Nonetheless, an evaluation of the central fringes as described above is possible.

In FIG. 4A, it is additionally indicated by way of arrow 21, that relative movements between sample and interference fringe are also possible. To this end, the TIC prism can be moved on the one hand or the sample on the other hand. The possibilities of the movement are not limited to a translation. A rotation is also feasible. In this way, the 2D overall topography of the sample can ultimately be determined sequentially, both for fringes of type 16 and for fringes of type 17. Although the advantage of the one-shot measurement is thereby lost, however, compared to standard methods, the construction is comparatively simple.

It is noted that the TIC application disclosed to date is aimed at the evaluation of the fringe displacement q in FIG. 2B. The thickness of the coating 13 can be deduced therefrom.

LIST OF REFERENCE NUMERALS 1 light source
2 illumination lens
3 circular polarizer
4 plane glass
5 TIC prism
6 objective lens
7 object plane
8 circular analyzer
9 tube lens
10 plane
11 sample, flat surface
12 dirt artifact
13 rough surface, coating
14 duplicate artifact
15 interference pattern (light fraction)
16 interference pattern (light fraction)
17 interference pattern (light fraction)
18 P (fringe)
19 q (fringe shifting)
20 interference pattern
21 arrow (direction)
x direction
y direction (shearing direction)
z direction (height value)
s spacing of images offset to one another and interfering with one another

The invention claimed is:

1. A method for determining roughness data, topography data or both roughness data and topography data of surfaces in material microscopy based on a shearing polarization interferometrical sequence with a microscopic "TIC" module ("Total Interference Contrast Module") of a microscope:
   wherein the method is carried out either polychromatically or monochromatically; and
   the method comprising the steps of:
   generating at least two tilted wave fronts, which after reflection from or transmission through a sample generate two images of said sample in the form of fringe patterns, said images being offset relative to one another and interfering with one another;
   determining roughness values and height topographies of a surface of the sample by application of image evaluation; and
   defining a reference beforehand to perform a center evaluation of individual line profiles with direct determination of height topographies.

2. The method for determining roughness data, topography data or both roughness data and topography data of surfaces in material microscopy according to claim 1, further comprising carrying out the method with circularly polarized light.

3. The method for determining roughness data, topography data or both roughness data and topography data of surfaces in material microscopy according to claim 2, further comprising calibrating height data by application of an optical model that converts a measured phase into a height (x) or into other optical parameters of the sample.

4. The method for determining roughness data, topography data or both roughness data and topography data of surfaces in material microscopy according to claim 1, further comprising making an integral evaluation perpendicularly to the fringe patterns for the purpose of directly determining the topography data.

5. The method for determining roughness data, topography data or both roughness data and topography data of surfaces in material microscopy according to claim 1, further comprising using a Fourier analysis to make an extensive evaluation of the topography data.

6. The method for determining roughness data, topography data or both roughness data and topography data of surfaces in material microscopy according to claim 1, further comprising carrying out a scanning of the fringe patterns along a defined direction through a defined phase shift between the wave fronts by shifting the TIC prism, by shifting the sample or by a combination of shifting the TIC prism and shifting the sample for the purpose of capturing two-dimensional topography data.

7. The method for determining roughness data, topography data or both roughness data and topography data of surfaces in material microscopy according to claim 6, further comprising, subjecting the TIC prism to a rotational movement.

8. A method for determining roughness data, topography data or both roughness data and topography data of surfaces in material microscopy based on a shearing polarization interferometrical sequence with a microscopic "TIC" module ("Total Interference Contrast Module") of a microscope:
   wherein the method is carried out either polychromatically or monochromatically; and
   the method comprising the steps of:
      generating at least two tilted wave fronts, which after reflection from or transmission through a sample generate two images of said sample in the form of fringe patterns, said images being offset relative to one another and interfering with one another;
      determining roughness values and height topographies of a surface of the sample by application of image evaluation; and
      making comparisons and summations of individual height lines with other height lines for the purpose of statistical evaluation of the individual height lines.

9. The method for determining roughness data, topography data or both roughness data and topography data of surfaces in material microscopy according to claim 8, further comprising carrying out the method with circularly polarized light.

10. The method for determining roughness data, topography data or both roughness data and topography data of surfaces in material microscopy according to claim 9, further comprising calibrating height data by application of an optical model that converts a measured phase into a height (x) or into other optical parameters of the sample.

11. The method for determining roughness data, topography data or both roughness data and topography data of surfaces in material microscopy according to claim 8, further comprising making an integral evaluation perpendicularly to the fringe patterns for the purpose of directly determining the topography data.

12. The method for determining roughness data, topography data or both roughness data and topography data of surfaces in material microscopy according to claim 8, further comprising using a Fourier analysis to make an extensive evaluation of the topography data.

13. The method for determining roughness data, topography data or both roughness data and topography data of surfaces in material microscopy according to claim 8, further comprising carrying out a scanning of the fringe patterns along a defined direction through a defined phase shift between the wave fronts by shifting the TIC prism, by shifting the sample or by a combination of shifting the TIC prism and shifting the sample for the purpose of capturing two-dimensional topography data.

14. The method for determining roughness data, topography data or both roughness data and topography data of surfaces in material microscopy according to claim 13, further comprising, subjecting the TIC prism to a rotational movement.

* * * * *